United States Patent Office 3,160,558
Patented Dec. 8, 1964

3,160,558
METHOD OF PRODUCING ANTI-TUSSIVE ACTION WITH 4 - TRIFLUOROMETHYL - BENZOIC ACID DERIVATIVES
Roland-Yves Mauvernay, Riom, France, assignor to Centre Europeen de Recherches Mauvernay, Riom, Puy-de-Dome, France
No Drawing. Filed Sept. 27, 1962, Ser. No. 227,657
Claims priority, application France, May 5, 1962, 896,591; June 25, 1962, 901,887
3 Claims. (Cl. 167—55)

The present invention relates to new 2-allyloxy-benzoic acid derivatives, and more particularly to 4-trifluoromethyl-2-allyloxy-benzoic acid derivatives which have important pharmacological activity, particularly as anti-tussives.

It is an object of the present invention to provide new anti-tussive compounds.

It is a further object of the present invention to provide new 2-allyloxy-benzoic acid derivatives which have a high degree of activity as anti-tussives comparative to the anti-tussive action of codeine without being a drug of addiction and while having a much lower toxicity.

It is yet another object of the present invention to provide for the production of the new compounds of this invention.

It is still another object of the present invention to provide compositions containing the compounds of the present invention for anti-tussive purposes, and also to provide for the use of the compounds of the present invention to achieve an anti-tussive action.

Other objects and advantages of the present invention will be apparent from a further reading of the specification and of the appended claims.

With the above and other objects in view, the present invention mainly comprises a compound selected from the group consisting of compounds of the formula:

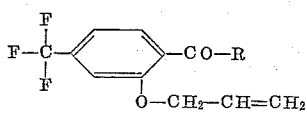

wherein R is selected from the group consisting of

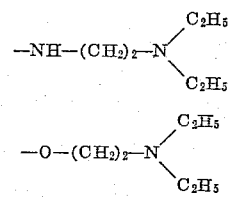

and

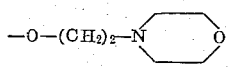

and non-toxic, physiologically compatible acid addition salts thereof.

The most preferred anti-tussive compound of the present invention is 4-trifluoromethyl-2-allyloxy-4-N-(β-diethylaminoethyl)-benzamide of the following structural formula:

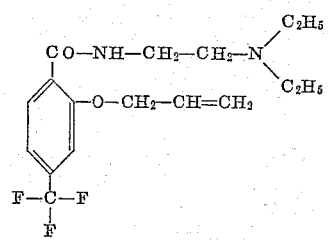

and the most preferred acid addition salt is the hydrochloride. It should be noted that other acid addition salts than the hydrochloride may be used for the purposes of the present invention, the hydrochloride being preferred for reasons of economy, ready availability and compatibility at least equal to any of the other acid addition salts.

The compounds of the present invention may be mixed with any normal pharmaceutical carrier, either for peroral administration or for injection, utilizing an anti-tussive effective amount of the compound, which amount is relatively low, for example as low as 12.5 mg./kg., a dose of 25 mg./kg. being sufficient to effect complete relief from the cough.

The compounds of the present invention may be produced according to the following equations:

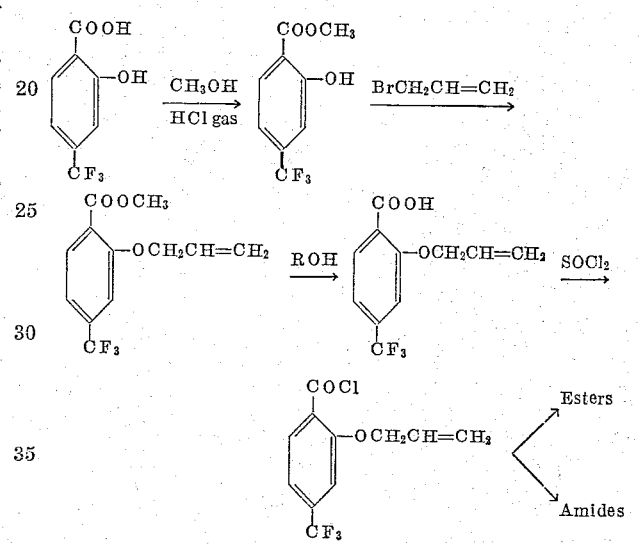

Thus, in accordance with the present invention 2-hydroxy-4-trifluoromethyl-benzoic acid is reacted with methanol to form the corresponding methyl benzoate which is then reacted with an allyl halide such as allyl bromide to form the corresponding 2-allyloxy-4-trifluoromethyl-methyl benzoate. This latter compound is then reacted with thionyl chloride to form the corresponding 2-allyloxy-4-trifluoromethyl-benzoyl chloride, which compound may then be amidated with β-diethylaminoethyl amine to form the corresponding benzamide wherein R is

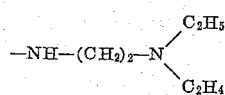

on the other hand, the benzoyl chloride may be esterified with β-diethylaminoethanol to form the corresponding ester wherein R is

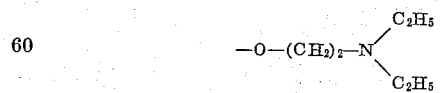

or with morpholinoethanol to form the corresponding ester wherein R is

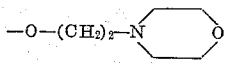

The following example is given to further illustrate the method of the present invention. The scope of the invention is not, however, meant to be limited to the specific details of the example.

EXAMPLE

(a) The Production of Meta-Nitro-Trifluoromethyl-Benzene 146 g. of trifluoromethyl benzene are vigorously agitated in 300 cc. of concentrated sulfuric acid. The reaction mixture is cooled in an ice bath and there is added drop by drop a mixture of 120 cc. of concentrated nitric acid and 120 cc. of concentrated sulfuric acid. Stirring is continued for 7 hours and the reaction mixture is allowed to slowly return to normal temperature. The liquid is decanted. The residue is washed with water, dried on anhydrous sodium sulfate and distilled. The boiling point of the product at 14 mm. Hg is 89° C., and the yield is 85% of the theoretical.

(b) The Production of 3-Trifluoromethyl-Aniline 850 cc. of 95% alcohol, 200 cc. of water, 205 g. of meta-hydroxy-phenylfluoroform and 110 cc. of hydrochloric acid ($d=1.19$) are vigorously agitated. There is then added in small fractions 213 g. of iron powder. After the addition the mixture is heated for 2 hours at 80° C. The reaction mixture is filtered, the precipitate is washed with alcohol, the alcohol is evaporated and the residue is taken up by ether. The ethereal solution is washed with water, dried on sodium sulfate, the ether is evaporated, and distilled. The boiling point of the compound at 14 mm. Hg is 84° C., and the yield is 75%.

(c) The Production of Meta-Hydroxy-Phenyl-Fluoroform 75 g. of 3-trifluoromethyl-aniline are dissolved by boiling in a mixture of 500 cc. of water and 75 cc. of concentrated sulfuric acid. The reaction mixture is cooled to 0° C. and there is added with agitation a solution of 33 g. of sodium nitrite in 100 cc. of water. The reaction mixture is further stirred for 1 hour and filtered.

The solution of the salt of the obtained diazonium is slowly introduced into a boiling mixture of 400 cc. of water and 150 cc. of concentrated sulfuric acid. At the same time the water vapor is carried over in distillation and the distillate is extracted by 200 cc., 100 cc. and again 100 cc. of ether, then dried over sodium sulfate and distilled. The boiling point of the product at 14 mm. Hg is 76° C., and the yield is 70%.

(d) The Production of 2-Hydroxy-4-Trifluoromethyl-Benzoic Acid 32.6 g. of meta-hydroxy-phenyl-fluoroform are added to a solution of sodium ethylate formed from 150 cc. of absolute alcohol and 4.6 g. of sodium. The alcohol is evaporated and dried under vacuum.

The obtained phenate is mixed with 6 g. of solid carbon dioxide and heated to 140° C. during 2 hours in a small autoclave. The resulting product is dissolved in water and precipitated by hydrochloric acid. The precipitate is filtered, taken up by a solution of sodium carbonate, precipitated by hydrochloric acid, washed with water and dried. The yield is 65%.

(e) The Production of 2-Hydroxy-4-Trifluoromethyl-Methyl Benzoate 250 cc. of methanol, 40 g. of concentrated sulfuric acid and 75 g. of the acid obtained in (d) above are heated for 30 hours under refluxing. The reaction mixture is then poured into a large excess of water, extracted with ether, the ether is evaporated and distilled off. The boiling point of the compound at 10 mm. Hg is 94° C. The yield is 80%.

(f) The Production of 2-Allyloxy-4-Trifluoromethyl-Methyl Benzoate 61 g. of the ester obtained under (e) above are mixed with 42 g. of potassium carbonate, 200 cc. of acetone and 33 g. of allyl bromide. The mixture is heated in a water bath under refluxing for 10 hours. It is then filtered, the precipitate is washed with acetone, and the acetone is evaporated. The boiling point of the compound at 2 mm. Hg is 103° C. and the yield is 80%.

(g) The Production of 2-Allyloxy-4-Trifluoromethyl-Benzoic Acid 100 g. of the compound obtained under (f) above is heated for 2 hours under refluxing in 300 cc. of a mixture of 350 g. of potassium hydroxide, 250 cc. of water, and methanol q.s. 1000 cc. The reaction mixture is then poured into water and the product precipitated by hydrochloric acid. The precipitate is filtered, washed with water and dried. The melting point is 99–110° C.

(h) The Production of 2-Allyloxy-4-Trifluoromethyl-Benzoyl Chloride 56 g. of the compound obtained under (g) above is heated with 25 cc. of thionyl chloride in 200 cc. of benzene until the evolution of gas is terminated. The benzene is then evaporated.

(i) The Production of 2-Allyloxy-4-Trifluoromethyl-N-($\beta$-Diethylaminoethyl)-Benzamide and Its Hydrochloride 29 g. of the benzoyl chloride obtained under (h) above is dissolved in 200 cc. of chloroform. The reaction mixture is stirred and cooled in an ice bath. There is added drop by drop 25 g. of diethylamino ethylamine. The reaction mixture is then stirred for an additional hour at ambient temperature. The chloroform solution is washed with water, dried on sodium sulfate and the solvent is evaporated.

The base is taken up by ethyl alcohol saturated with hydrochloric acid until an acid pH is reached. A small amount of dry ether is added until the start of crystallization, and crystallization is then permitted. The melting point of the compound is 108° C. The theoretical nitrogen content is 7.33%, and the nitrogen content found is 7.37%.

As indicated above, the compounds of the present invention are anti-tussive compounds which are unrelated to the morphines and their derivatives. Studies have shown that these compounds in comparison to codeine phosphate possess a considerably lower toxicity while having an important anti-tussive action without any depressive action on the central respiratory system and without any depressive action on intestinal motility. In addition, these compounds have an anti-histaminic activity without having any notable deleterious side effects.

The following test results carried out on 2-allyloxy-4-trifluoromethyl-N-($\beta$-diethylaminoethyl) - benzamide and comparing the same with codeine illustrates the superior properties of the compounds of the invention.

In the further discussion of pharmacological tests which follows below the compound of the present invention which was tested was 2-allyloxy-4-trifluoromethyl-N-($\beta$-diethylaminoethyl) - benzamide - hydrochloride, and for convenience this compound will in the further discussion which follows be referred to as 305 C.E.

The $LD_{50}$ on mice was determined by the method of Behrens and Karber. The product tested was administered in increasing doses on lots of 6 animals which were then observed for 48 hours. Under these conditions it was found that the $LD_{50}$, per os, of the compound is 1370 mg./kg.

The $LD_{50}$ of codeine (phosphate) upon oral administration to mice varies, according to different authors, at between 470 and 650 mg./kg.

The anti-tussive action was determined by the technique of Domenjoz by electrical excitation of the superior laryngeal nerve of the cat. The product was administered intraduodenally with increasing doses. It was found that at a dose of 12.5 mg./kg. the action of 305 C.E. is clear but of short duration (30 minutes). At a dose of 25 mg./kg. the anti-tussive action starts 15 minutes after administration and is maintained for one hour. At a dose of 50 mg./kg. a marked anti-tussive action occurs starting 15 minutes after administration and continuing for 2 to 3 hours.

A dose of 25 mg./kg. of 305 C.E. has a slightly greater anti-tussive action than 5 mg./kg. of codeine, and a dose of 50 mg./kg. of 305 C.E. has an action considerably superior to 10 mg./kg. of codeine. Most important, the anti-tussive action of codeine is accompanied with a considerable reduction in the respiratory rhythm, which does not occur with 305 C.E.

Of great importance it was determined that 305 C.E. does not cause any modification of the intestinal peristalsis, contrary to codeine and other morphine derivatives.

Compositions containing the active agents of the present invention can be prepared in the form of liquids, for example syrups, tablets, dragées, suppositories and the like. In the case of liquids the concentration of active ingredient is most preferably 1 g. per liter, with the dosage being 3 to 4 tablespoons per day. In the case of tablets, using normal pharmaceutical excipients each tablet contains 25 to 50 mg., with the dosage being 1 to 6 tablets per day. Suppositories may be prepared with 10, 25 or 50 mg. of active ingredient per suppository, the dosage being 1 to 2 suppositories per 24 hours.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of achieving an anti-tussive action which comprises administering to a patient requiring the same a compound selected from the group consisting of compounds of the formula:

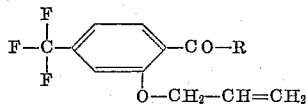

wherein R is selected from the group consisting of

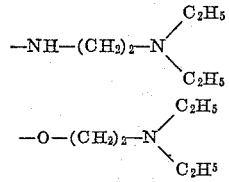

and

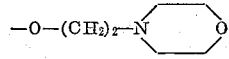

and non-toxic, physiologically compatible acid addition salts thereof.

2. The method of achieving an anti-tussive action which comprises administering to a patient requiring the same 2-allyloxy-4-trifluoromethyl - N-($\beta$ - diethylaminoethyl)-benzamide.

3. The method of achieving an anti-tussive action which comprises administering to a patient requiring the same 2-allyloxy-4-trifluoromethyl - N -($\beta$ - diethylaminoethyl)-benzamide-hydrochloride.

References Cited in the file of this patent
UNITED STATES PATENTS

| | | |
|---|---|---|
| 2,819,305 | Lott | Jan. 7, 1958 |
| 2,895,992 | Ohnacker et al. | July 21, 1959 |
| 2,937,118 | Von Haxthausen et al. | May 17, 1960 |
| 3,063,902 | Gray et al. | Nov. 13, 1962 |